(12) United States Patent
Liao

(10) Patent No.: US 6,782,628 B2
(45) Date of Patent: Aug. 31, 2004

(54) LEVEL HAVING ROTATABLE VIAL SUPPORT DEVICE

(76) Inventor: Vincent Liao, No. 53-1, Guan Jen Road, Da Li City, Taichung Hsien (TW), 412

(*) Notice: Subject to any disclaimer, the term of this patent is extended or adjusted under 35 U.S.C. 154(b) by 2 days.

(21) Appl. No.: 10/305,909

(22) Filed: Nov. 27, 2002

(65) Prior Publication Data
US 2004/0098874 A1 May 27, 2004

(51) Int. Cl.[7] .............................. G01C 9/36; G01C 9/28
(52) U.S. Cl. ............................................. 33/384; 33/390
(58) Field of Search ........................ 33/384, 383, 374, 33/385, 386, 387, 388, 390, 375, 382

(56) References Cited

U.S. PATENT DOCUMENTS

| | | | | |
|---|---|---|---|---|
| 1,333,559 A | * | 3/1920 | Moulton | 33/382 |
| 2,748,494 A | * | 6/1956 | Raney | 33/383 |
| 2,752,692 A | * | 7/1956 | Smith | 33/374 |
| 2,806,296 A | * | 9/1957 | Weichert | 33/334 |
| 3,146,529 A | * | 9/1964 | Chamberlin | 33/370 |
| 3,225,451 A | * | 12/1965 | Olexson et al. | 33/347 |
| 4,317,289 A | * | 3/1982 | Conn | 33/498 |
| 4,785,544 A | * | 11/1988 | Heinsius et al. | 33/334 |
| 5,174,034 A | * | 12/1992 | Swanda | 33/365 |
| 5,685,083 A | * | 11/1997 | Decesare | 33/390 |
| 5,839,200 A | * | 11/1998 | Decesare | 33/381 |
| 6,282,805 B1 | | 9/2001 | Cosentino | 33/374 |

* cited by examiner

Primary Examiner—Diego Gutierrez
Assistant Examiner—R. Alexander Smith
(74) Attorney, Agent, or Firm—Charles E. Baxley

(57) ABSTRACT

A level includes a plate secured to a casing and rotatable relative to the casing between a closed and an open positions. A bubble vial is attached to the plate. The plate has one or more catches for openably securing the plate to the casing. The casing includes one or more retainers for retaining the plate at the open position relative to the casing. A level housing has a chamber for receiving the casing, and the casing has one or more latched engageable with the level housing. The bubble vial preferably includes a cylindrical shape having a flat upper surface.

16 Claims, 6 Drawing Sheets

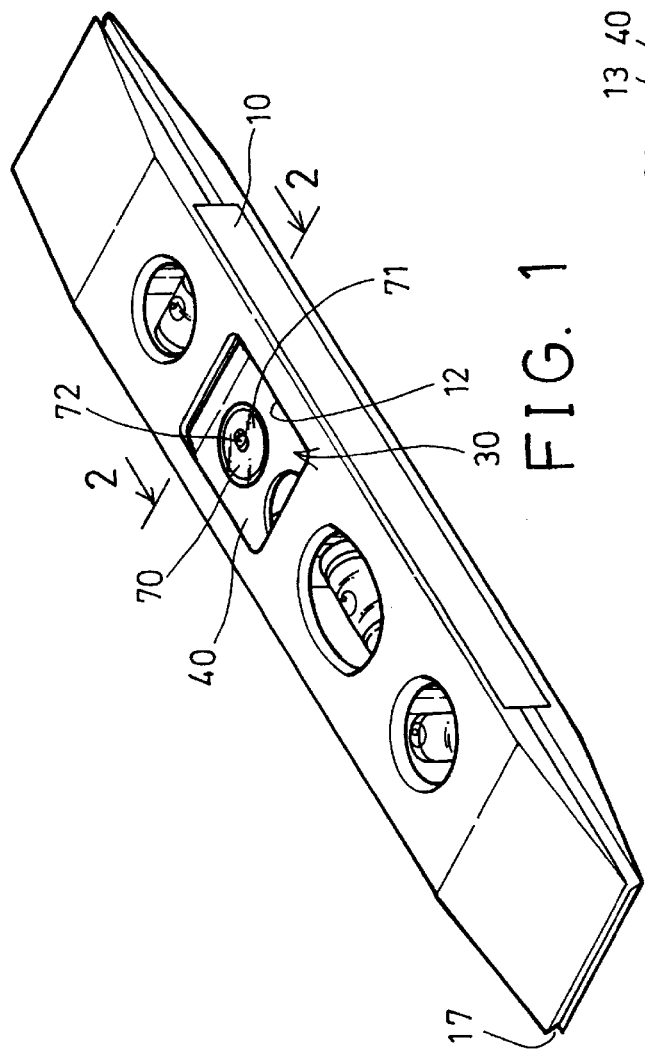
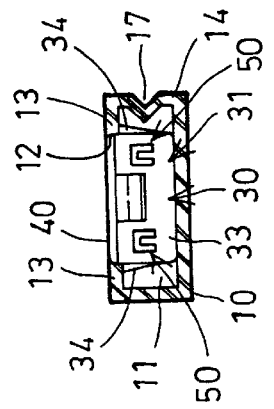
FIG. 1
FIG. 2

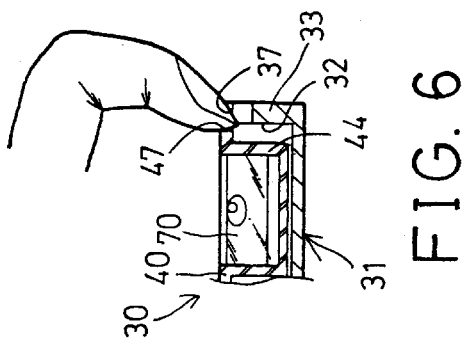
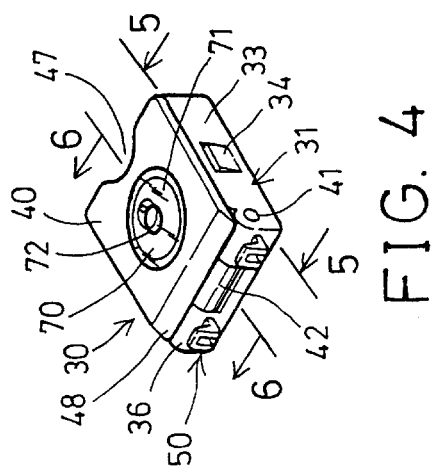
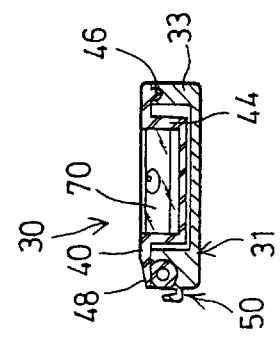
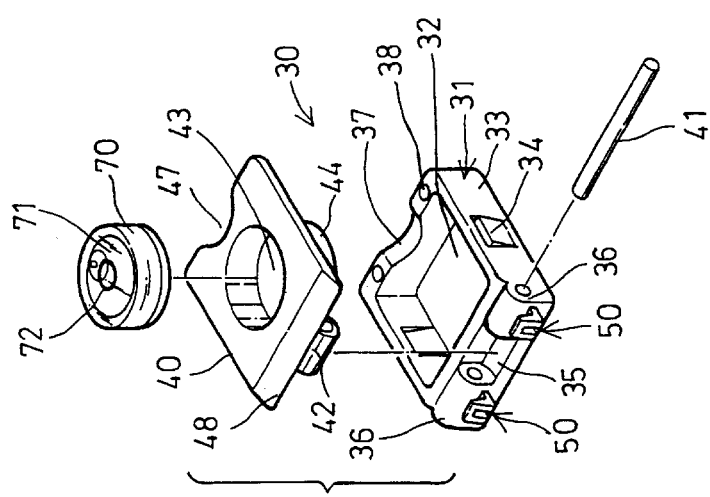

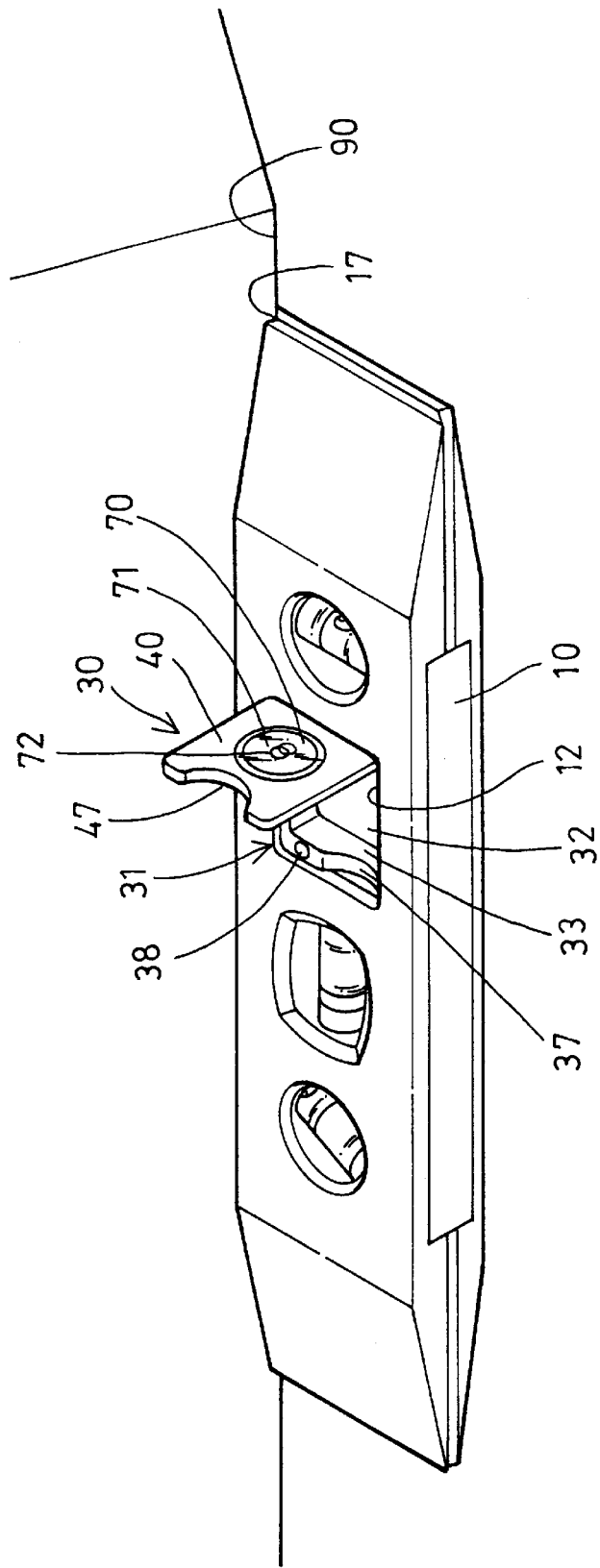

LEVEL HAVING ROTATABLE VIAL SUPPORT DEVICE

BACKGROUND OF THE INVENTION

1. Field of the Invention

The present invention relates to a level, and more particularly to a level having a rotatable vial support device.

2. Description of the Prior Art

Various kinds of typical modular level devices have been developed for establishing a horizontal level reference line, or a vertical plumb reference line, and comprise one or more bubble vials solidly or detachably secured into a level housing. Normally, the bubble vials are solidly secured to the level housing and may not be moved or adjusted relative to the level housing.

U.S. Pat. No. 6,282,805 to Cosentino discloses an example of the typical levels including an adjustable bubble vial provided in a level housing. However, the bubble vial may only be micro-adjusted relative to the level housing for few degrees.

The typical levels do not suggest to provide a rotatable vial support device for rotatably supporting the bubble vials to a level housing, such that the bubble vials of the typical levels may not be rotated relative to the level housing.

The present invention has arisen to mitigate and/or obviate the afore-described disadvantages of the conventional levels.

SUMMARY OF THE INVENTION

The primary objective of the present invention is to provide a level including a rotatable vial support device for rotatably supporting bubble vials to level housing, and for allowing the bubble vials to be rotated relative to the level housing.

In accordance with one aspect of the invention, there is provided a level comprising a casing including a first side and a second side, a plate including a first side rotatably secured to the first side of the casing with a pivot shaft, that allows the plate to be rotated relative to the casing about the pivot shaft between a closed position and an open position, and a bubble vial attached to the plate, and rotated in concert with the plate relative to the casing, such that the bubble vial may also be rotated relative to the casing between the open position and the closed position.

The casing includes a space formed therein and defined by a peripheral fence, and the bubble vial is receivable in the space of the casing. The casing includes an orifice formed therein and defined by a peripheral panel to receive the bubble vial in the orifice of the casing.

The first side of the casing includes a cavity defined between two swellings, the plate includes an ear rotatably received in the cavity of the casing.

The casing includes a device for locking the plate to the casing at the closed position, and having at least one hole formed in the second side of the casing, and at least one catch extended from the second side of the plate and engageable into the hole of the casing.

The plate includes a recess formed in the second side thereof. The casing also includes a recess formed in the second side thereof, and preferably aligning with the recess of the plate, for allowing the plate to be easily opened relative to the casing.

The casing includes a device for securing the plate to the casing at the open position, and having a retainer attached to the first side of the casing, and engageable with the first side of the plate.

The retainer includes a bar attached to the casing, and an arm extended from the bar, to define a slot between the arm and the casing, and to receive the first side of the plate in the slot of the retainer. The arm includes an inclined inner surface facing the slot of the retainer.

A level housing is further provided and has a chamber formed therein to receive the casing in the chamber of the level housing. The casing includes at least one latch extended therefrom and engageable with the level housing, to secure the casing to the level housing.

The level housing includes an opening formed therein and communicating with the chamber thereof, and defined by a peripheral rib, the casing is engageable into the chamber of the level housing via the opening of the level housing, and the latch is engageable with the peripheral rib of the level housing, to secure the casing to the level housing.

The bubble vial includes a cylindrical shape having a flat upper surface, and includes a circular indication provided on the upper surface thereof.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a level having a rotatable vial support device in accordance with the present invention;

FIG. 2 is a cross sectional view taken along lines 2—2 of FIG. 1;

FIG. 3 is an exploded view of the rotatable vial support device of the level;

FIG. 4 is a perspective view of the rotatable vial support device of the level, in which the rotatable vial support device is in a closed position;

FIGS. 5, 6 are cross sectional views taken along lines 5—5, and 6—6 of FIG. 4 respectively;

FIG. 11 is a perspective view illustrating the operation of the rotatable vial support device of the level.

DETAILED DESCRIPTION OF THE PREFERRED EMBODIMENT

Figure 8:
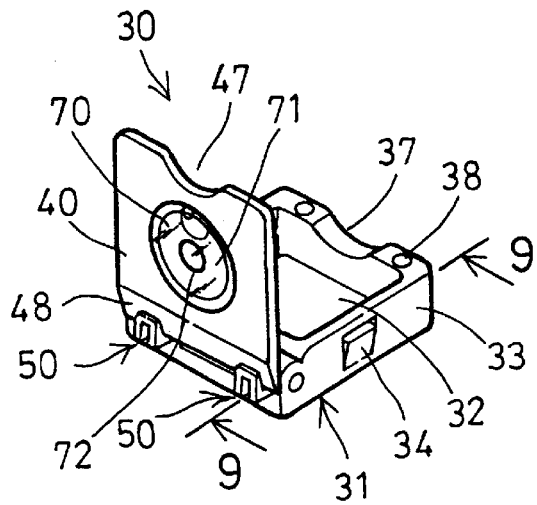
FIG. 8 is a perspective view of the rotatable vial support device of the level, in which the rotatable vial support device is in an open position.

Referring to the drawings, and initially to FIGS. 1–4, a level in accordance with the present invention comprises a level housing 10 including a chamber 11 (FIG. 2) formed therein, and including one or more openings 12 formed therein, and communicating with the chamber 11 thereof, and formed or defined by peripheral ribs 13 (FIG. 2).

The level housing 10 further includes a peripheral wall 14 for forming or defining the chamber 11 therein, and includes one or more angles or V-shaped notches 17 formed in one or more portions, such as the side portions of the peripheral wall 14, for engaging with or for receiving the angle 90 of the object (FIG. 11).

The level in accordance with the present invention further comprises one or more rotatable vial support devices 30 to be received in or engaged into the chamber 11 of the level housing 10 via the opening 12 of the level housing 10, and to be detachably secured to the level housing 10, or to be snapped onto the level housing 10.

For example, the rotatable vial support device 30 includes a casing 31 having a space 32 formed therein, such as defined by a peripheral fence 33, and includes one or more latches 34 extended outwardly from the outer peripheral portion of the peripheral fence 33, for engaging with the level housing 10, such as the peripheral rib 13 of the level housing 10, and thus for securing the rotatable vial support device 30 to the level housing 10.

A plate 40 has one side, such as the rear side pivotally or rotatably secured to one side, such as the rear side of the casing 31 with a pivot shaft 41. For example, the casing 31 includes a cavity 35 formed in the rear side thereof, and defined between two relative swellings 36, for rotatably receiving an ear 42 of the plate 40. The pivot shaft 41 is engaged through the swellings 36 and the ear 42 for rotatably securing the plate 40 to the casing 31.

The plate 40 includes an orifice 43 formed therein and formed or defined by a peripheral panel 44. For example, the orifice 43 and the peripheral panel 44 of the plate 40 include a circular cross section for receiving a circular bubble vial 70 therein.

The bubble vial 70 may be secured to the plate 40 with fasteners, latches, adhesive materials, or by welding processes, or with force-fitted engagement, or the like. The bubble vial 70 preferably includes a cylindrical shape having a flat and circular upper surface 71, and having a circular indication 72 provided on the circular upper surface 71.

Figure 9:
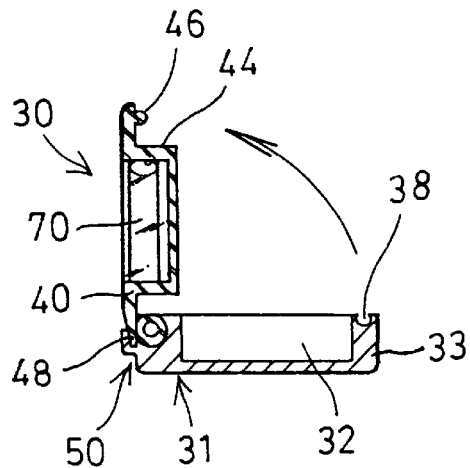
FIG. 9 is a cross sectional view taken along lines 9—9 of FIG. 8.

The plate 40 and thus the bubble vial 70 are thus rotatable relative to the casing 31 about the pivot shaft 41, between a closed or store position as shown in FIGS. 1, 2, 4–6, and an open position as shown in FIGS. 8, 9, 11. As best shown in FIGS. 4–6, when the plate 40 is rotated relative to the casing 31 to the closed or store position, the peripheral panel 44 of the plate 40 and the bubble vial 70 may be received in the space 32 of the casing 31.

The casing 31 includes a recess 37 and one or more holes 38 formed in the upper and front portion of the peripheral fence 33. The plate 40 includes one or more catches 46 extended from the front portion thereof and detachably engageable into the corresponding holes 38 of the casing 31, for openably securing or locking the plate 40 to the casing 31.

The plate 40 also includes a recess 47 formed in the front portion thereof and aligned with the recess 37 of the casing 31, for receiving the finger of the user (FIG. 6), and for allowing the user to easily move the plate 40 relative to the casing 31, in order to disengage the catches 46 from the holes 38 of the casing 31.

Figure 7:
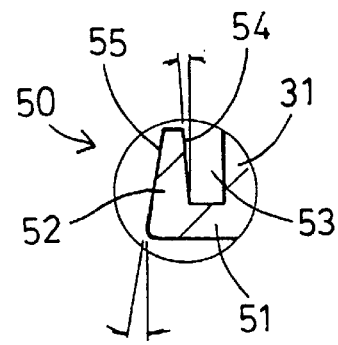
FIG. 7 is an enlarged partial cross sectional view of the rotatable vial support device.
Figure 10:
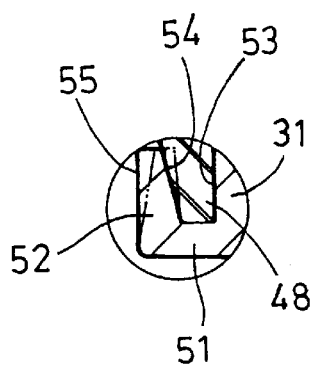
FIG. 10 is an enlarged partial cross sectional of the rotatable vial support device as shown in FIGS. 8 and 9.

As shown in FIGS. 3–5 and 7–10, the casing 31 includes one or more retainers 50 attached to or provided on the rear portion thereof for engaging with the plate 40, and for locking or retaining the plate 40 at the open position as shown in FIGS. 8, 9. The retainers 50 each includes a bar 51 secured to or extended from the casing 31, and an arm 52 extended upwardly from the bar 51, for forming or defining a gap or a slot 53 between the casing 31 and the arm 52 (FIGS. 7, 10).

The plate 40 includes a rear edge or flange 48 engageable into the slot 53 formed or defined between the casing 31 and the arm 52 (FIG. 10), in order to lock or to secure the plate 40 to the casing 31 at the open position as shown in FIGS. 8, 9. The arm 52 preferably includes an inclined inner surface 54 (FIG. 7) facing the slot 53 of the retainer 50, for facilitating the engagement of the rear flange 48 of the plate 40 into the slot 53 of the casing 31 or of the arm 52.

The arm 52 may further includes an inclined outer surface 55 for forming a substantially trapezoid cross section that has a reduced upper or free end, in order to increase the resilience of the arm 52, and for further facilitating the engagement of the rear flange 48 of the plate 40 into the slot 53 of the casing 31 or of the arm 52.

It is preferable that the plate 40 may be arranged to be parallel to the flat upper surface or the longitudinal axis of the level housing 10, when the plate 40 is rotated relative to the casing 31 at the closed position; and the plate 40 may be arranged to be perpendicular to the flat upper surface or the longitudinal axis of the level housing 10, when the plate 40 is rotated relative to the casing 31 at the open position.

In operation, as shown in FIG. 11, the angle or notch 17 of the peripheral wall 14 may receive or may be engaged with the angle 90 of the object in order to level the object. The plate 40 may be rotated relative to the casing 31 and/or the level housing 10, for allowing the plate 40 and thus the bubble vial 70 to be positioned relative to the casing 31 at different position.

Figure 12:
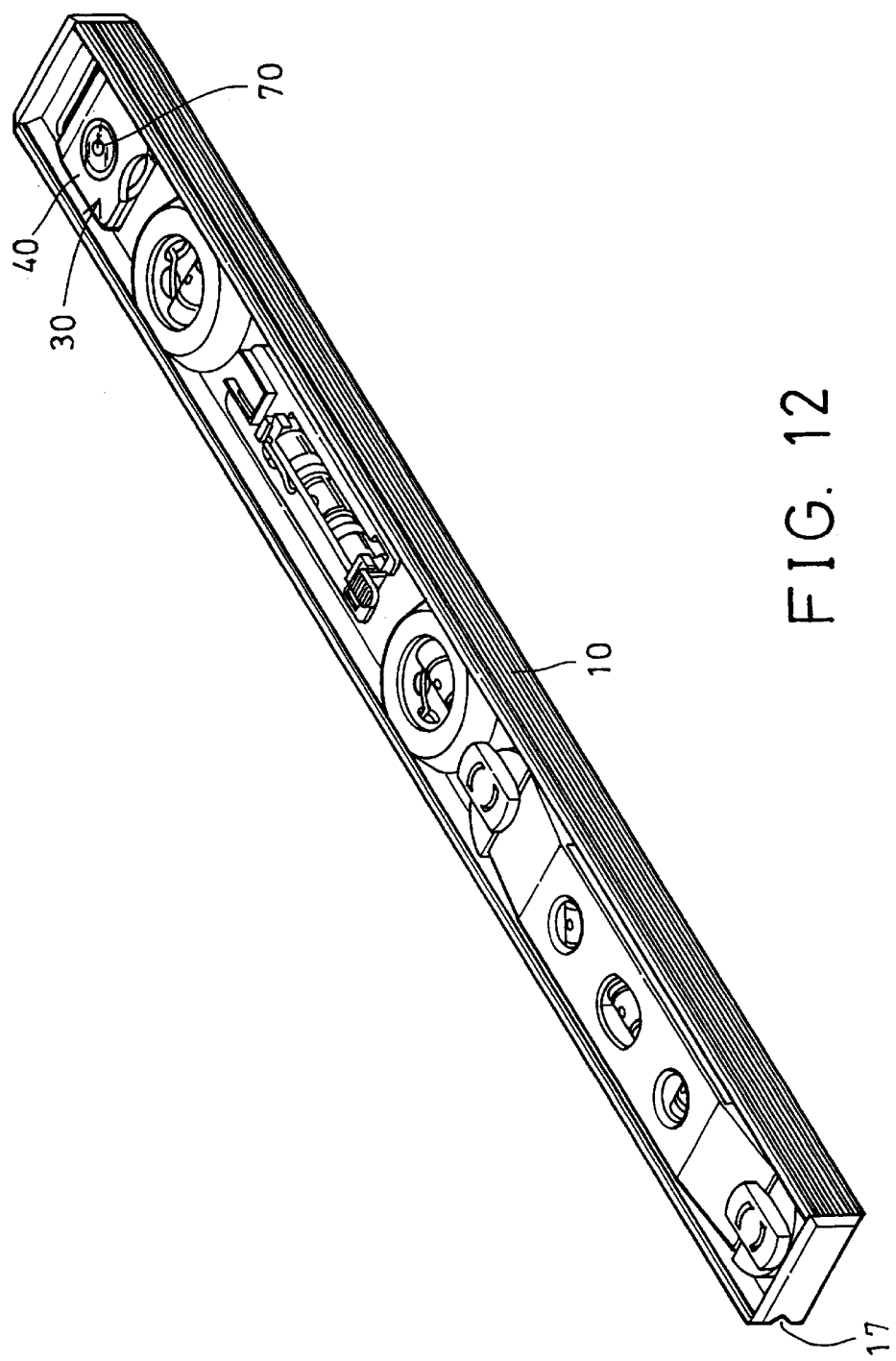
FIGS. 12, 13 are perspective views illustrating the attachment of the rotatable vial support device to different level housings.
Figure 13:
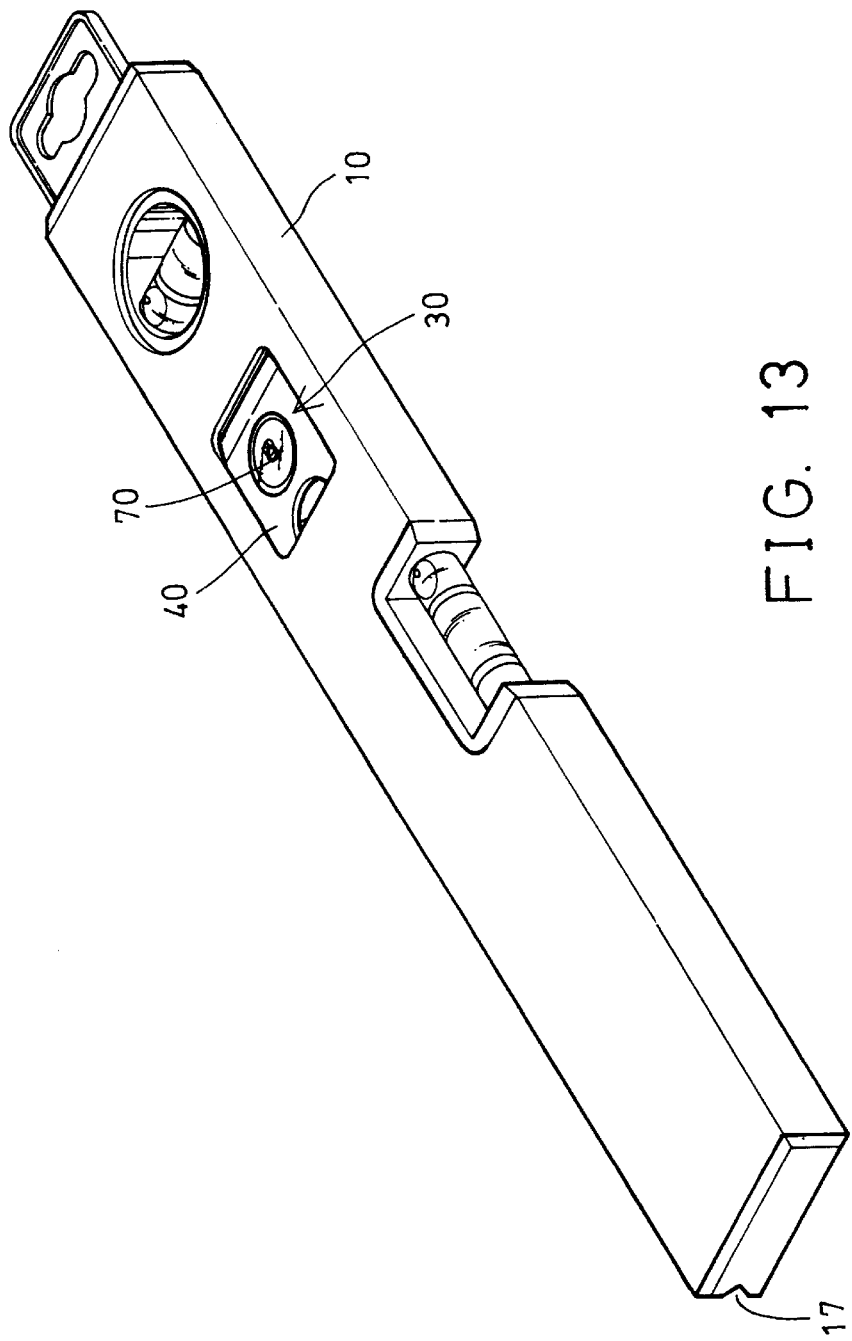

Referring next to FIGS. 12 and 13, the rotatable vial support device 30 may be attached or arranged to be engaged into various or different level housing 10.

Accordingly, the level in accordance with the present invention includes a rotatable vial support device for rotatably supporting bubble vials to level housing, and for allowing the bubble vials to be rotated relative to the level housing.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A level comprising:

a casing including a first side and a second side, a plate including a first side rotatably secured to said first side of said casing with a pivot shaft, that allows said plate to be rotated relative to said casing about said pivot shaft between a closed position and an open position, and said plate including a second side that swings away from the second side of the casing when the plate is moved to the open position and that swings adjacent to the second side of the casing when the plate is moved to the closed position, a bubble vial attached to said plate, and rotated in concert with said plate relative to said casing, and said casing including means for locking said plate to said casing at the closed position, said locking means including at least one hole formed in said second side of said casing, and at least one catch extended from said second side of said plate and engageable into said at least one hole of said casing.

2. The level according to claim 1, wherein said casing includes a space formed therein and defined by a peripheral fence, and said bubble vial is receivable in said space of said casing.

3. The level according to claim 2, wherein said plate includes an orifice formed therein and defined by a peripheral panel to receive said bubble vial in said orifice of said plate.

4. The level according to claim 1, wherein said first side of said casing includes a cavity defined between two swellings supporting said pivot shaft, said plate includes an ear rotatably received on said pivot shaft and within said cavity of said casing.

5. The level according to claim 1, wherein said plate includes a recess formed in said second side thereof.

6. The level according to claim 1, wherein said casing includes a recess formed in said second side thereof.

7. The level according to claim 1, wherein said casing includes means for securing said plate to said casing at the open position.

8. The level according to claim 7, wherein said securing means includes a retainer attached to said first side of said casing, and engageable with said first side of said plate.

9. The level according to claim 1, wherein said bubble vial includes a cylindrical shape having a flat upper surface.

10. The level according to claim 9, wherein said bubble vial includes a circular indication provided on said upper surface thereof.

11. A level comprising:

a casing including a first side and a second side, a plate including a first side rotatable secured to said first side of said casing with a pivot shaft, that allows said plate to be rotated relative to said casing about said pivot shaft between a closed position and an open position, a bubble vial attached to said plate, and rotated in concert with said plate relative to said casing, and said casing including means for securing said plate to said casing at the open position, said securing means including a retainer attached to said first side of said casing, and engageable with said first side of said plate, said retainer including a bar attached to said casing, and an arm extended from said bar, to define a slot between said arm and said casing, and to receive said first side of said plate in said slot of said retainer.

12. The level according to claim 11, wherein said arm includes an inclined inner surface facing said slot of said retainer.

13. A level comprising:

a casing including a first side and a second side, a plate including a first side rotatably secured to said first side of said casing with a pivot shaft, that allows said plate to be rotated relative to said casing about said pivot shaft between a closed position and an open position, a bubble vial attached to said plate, and rotated in concert with said plate relative to said casing, and a level housing having a chamber formed therein to receive said casing in said chamber of said level housing.

14. The level according to claim 13, wherein said casing includes at least one latch extended therefrom and engageable with said level housing, to secure said casing to said level housing.

15. The level according to claim 14, wherein said level housing includes an opening formed therein and communicating with said chamber thereof, and defined by a peripheral rib, said casing is engageable into said chamber of said level housing via said opening of said level housing, and said at least one latch is engageable with said peripheral rib of said level housing, to secure said casing to said level housing.

16. The level according to claim 13, wherein said level housing includes at least one V-shaped notch formed therein.

* * * * *